Aug. 19, 1930.   W. E. AMBERG   1,773,250
PISTON RING
Filed Feb. 4, 1929
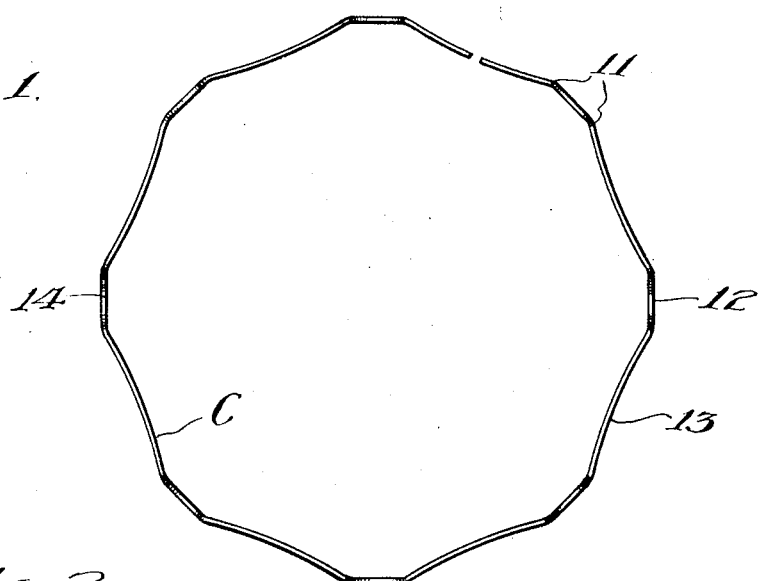
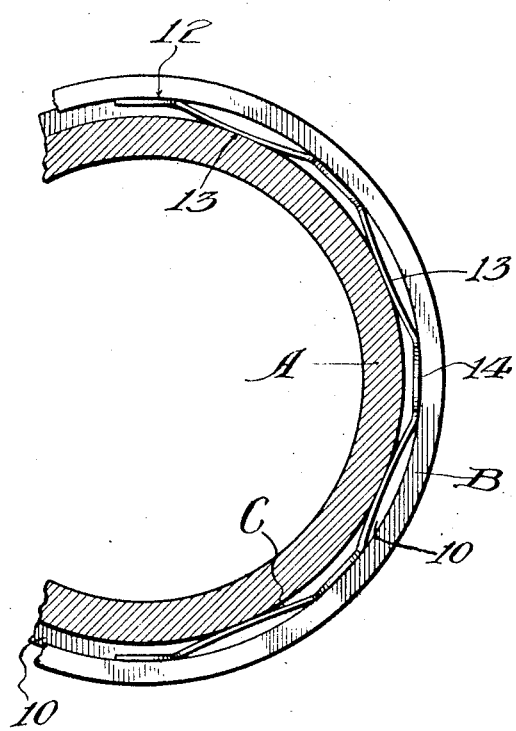
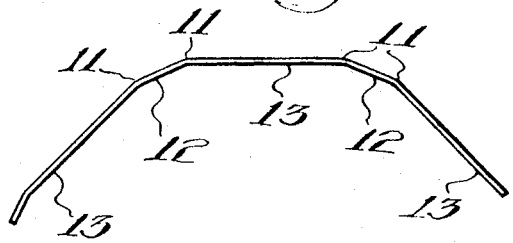
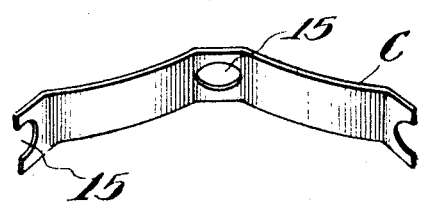
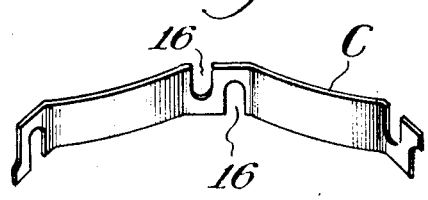
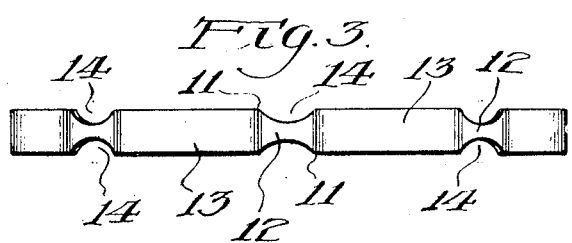
Inventor:
Walter E. Amberg, Patented Aug. 19, 1930

1,773,250

UNITED STATES PATENT OFFICE

WALTER E. AMBERG, OF GLEN ELLYN, ILLINOIS, ASSIGNOR, BY MESNE ASSIGNMENTS, TO SMALLEY ACCESSORIES CORPORATION, OF CHICAGO, ILLINOIS, A CORPORATION OF ILLINOIS

PISTON RING

Application filed February 4, 1929. Serial No. 337,202.

This invention, which is concerned generally with a piston ring, is directed more particularly to an associated spring which exerts upon the piston ring an outward tension at various points whereby the piston ring is maintained closely against the cylinder wall. An important object attained by my improved spring construction is the maintenance of a more yielding spring tension upon the ring at a greater number of points throughout an increased period of service. A spring having the features of advantage above noted, is illustrated by way of exemplification in the accompanying drawing in the manner following:

Figure 1 is an edge of plan view of the spring which is of substantially circular form;

Fig. 2 is a fragmentary cross section through a piston showing in elevation one of its rings together with an associated spring;

Fig. 3 is a side elevation of one form of the spring;

Fig. 4 is a fragmentary edge elevation of another form of the spring; and

Figs. 5 and 6 are fragmentary perspective views of two springs each representing a further modification of this invention.

Referring first of all to Fig. 2, I have shown therein a piston A having on its exterior surface an annular groove 10 wherein is received the usual ring B which should be in close fitting engagement with the cylinder wall (not shown). I associate with such a piston ring the present spring C which also is in the general form of a ring occupying a position rearwardly of the piston ring so as to exert thereon a force which tends to maintain the piston ring closely against the cylinder.

My improved spring may be produced from a relatively thin tempered steel band having a plurality of bends by which the entire band assumes the general form of a polygonal split ring. As shown, these bends 11 occur closely in pairs each defining between them a crimp 12 which is straight, or substantially so. Each crimp is preferably annealed or softened for a purpose which will appear hereinafter. Between the crimps are greater distances wherein the band may be straight or reversely curved to provide steps 13, an example of each form being suggested in Figures 1 and 4. The band may further be weakened at each crimp as by the provision of opposite slots 14 extending inwardly from its two edges (see Fig. 3) leaving only a narrow strip of material connecting the adjacent steps. The same result may be attained by punching out openings 15 (see Fig. 5) in which case two narrow connecting strips are left to constitute each crimp; or it may be accomplished by providing staggering slots 16 extending inwardly from the two opposite edges of the spring band (see Fig. 6). In each of these suggested constructions the slots or openings which result in weakening the spring between the strips are located within the double bends 11 which define the crimps 12.

In practice, a piston ring spring such as I have described will be fitted in the piston groove rearwardly of the piston ring that is also fitted therein. The depth of such a groove may vary greatly—perhaps from 1/64" to 5/32" or more. With the usual spring construction, the corner or crimp which initially stands out boldly is squashed or flattened down when the spring is fitted in place behind the piston ring, the degree of such squashing depending largely upon the clearance behind the piston ring. Most of the spring pressure against the ring is exerted at such corners or crimps, but due to their being squashed in when first installed, there is a tendency for the crimps to become prematurely set, i. e., lifeless. In such a spring, moreover, the steps between the crimps perform very little, if at all, in maintaining a tension against the piston ring, so that when the crimps give out, as above explained, the serviceable life of the spring is exhausted.

By way of contrast, the improved spring of my invention transfers to the steps most of the load which is to be sustained. This comes about from weakening the crimps, and from shaping the steps so that they exert collectively a tension force after the manner of a plurality of lever arms. Up to the time that the spring is installed behind a piston ring, the several crimps have function; after that they perform scarcely at all. It is the steps which exert the tension, and because the connecting crimps are relatively weak the steps are free to operate with greater resiliency.

I claim:

1. In combination with a ring fitted within the groove of a piston, a spring in the form of a band interposed between the ring and piston, the spring being configured to provide in alternation a series of flat crimps and steps, relatively weak and strong, respectively, the steps being bent reversely to the curvature of the piston whereby each step intermediately of its ends exerts a pressure against the piston.

2. In combination with a ring fitted within the groove of a piston, a spring in the form of a band interposed between the ring and piston, the spring being configured to provide in alternation a series of weakened flat crimps and reversely bent steps, the latter being required to exert the major tension force against the ring.

3. In combination with a ring fitted within the groove of a piston, a spring in the form of a band interposed between the ring and piston, the spring being configured to provide in alternation a series of crimps and steps, the former having a cross sectional area less than the latter whereby the crimps are weakened to require the steps to exert the major force against the spring.

4. In combination with a ring fitted within the groove of a piston, a spring in the form of a steel band interposed between the ring and piston, the spring being shaped to present a series of points bearing with opposite pressures against the ring and piston, and treated to provide tempered and softened portions at various places throughout its length.

5. In combination with a ring fitted within the groove of a piston, a spring in the form of a steel band interposed between the ring and piston, the spring being configured to provide in alternation a series of softened crimps and tempered reversely bent steps, the former bearing against the ring and the latter against the piston.

6. In combination with a ring fitted within the groove of a piston, a spring in the form of a band interposed between the ring and piston, the spring being configured to provide in alternation a series of crimps and steps, relatively weak and strong, respectively, the weakened crimp portions between their points of connection with the steps being spaced from the ring whereby to avoid bearing and wear at such weakened places.

7. In combination with a ring fitted within the groove of a piston, a spring in the form of a band interposed between the ring and piston, the spring being configured to provide in alternation a series of crimps and steps, the latter having a uniform cross section and having means by which the band sections between the steps are rendered weaker whereby the steps exert the major tension force against the ring.

In witness whereof, I have hereunto set my hand this 29th day of January, 1929.

WALTER E. AMBERG.